(12) United States Patent
Tran

(10) Patent No.: US 11,498,652 B2
(45) Date of Patent: Nov. 15, 2022

(54) UNMANNED UNDERSAND VEHICLE

(71) Applicant: United States of America as represented by the Secretary of the Navy, San Diego, CA (US)

(72) Inventor: Nghia X. Tran, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 874 days.

(21) Appl. No.: 16/394,489

(22) Filed: Apr. 25, 2019

(65) Prior Publication Data
US 2020/0338943 A1 Oct. 29, 2020

(51) Int. Cl.
| | | |
|---|---|---|
| *B60F 3/00* | (2006.01) | |
| *B63H 21/17* | (2006.01) | |
| *B62D 57/036* | (2006.01) | |
| *E21D 9/10* | (2006.01) | |
| *E21B 7/26* | (2006.01) | |
| *B63H 25/02* | (2006.01) | |
| *B63H 1/12* | (2006.01) | |

(52) U.S. Cl.
CPC ........... *B63H 21/17* (2013.01); *B62D 57/036* (2013.01); *E21B 7/26* (2013.01); *E21D 9/10* (2013.01); *B60F 3/0023* (2013.01); *B63H 2001/125* (2013.01); *B63H 2025/028* (2013.01)

(58) Field of Classification Search
CPC .............. B63H 21/17; B63H 2001/125; B63H 2025/028; B62D 57/036; E21B 7/26; E21D 9/10; B60F 3/0023

USPC .......................................................... 180/7.2
See application file for complete search history.

(56) References Cited

U.S. PATENT DOCUMENTS

| | | | | |
|---|---|---|---|---|
| 1,303,764 | A * | 5/1919 | Broadway | B60B 19/003 299/30 |
| 1,388,545 | A * | 8/1921 | Bohan | F42B 23/00 299/87.1 |
| 2,946,578 | A * | 7/1960 | De Smaele | E21B 4/18 175/392 |
| 3,059,711 | A * | 10/1962 | Becker | B62M 27/02 180/188 |
| 3,354,969 | A * | 11/1967 | Wolfgang | E21B 17/1057 175/207 |
| 3,375,885 | A * | 4/1968 | Scott | E02D 1/02 175/94 |
| 3,767,263 | A * | 10/1973 | Gootee | E21D 9/008 299/56 |
| 3,814,192 | A * | 6/1974 | Steen | E21B 19/24 173/187 |
| 3,892,194 | A * | 7/1975 | Goedde | F42B 15/20 89/1.809 |

(Continued)

*Primary Examiner* — Logan M Kraft
*Assistant Examiner* — John D Bailey
(74) *Attorney, Agent, or Firm* — Naval Information Warfare Center, Pacific; Kyle Eppele; J. Eric Anderson

(57) ABSTRACT

An unmanned vehicle capable of tunneling into soft materials, such as sand, comprises a hollow, bullet-shaped forward outer body with a first drive screw thread integrated into its exterior, a hollow cylindrical rear outer body with a second drive screw thread integrated into its exterior but threaded in the opposed direction of the first drive screw thread, and an inner body that is rotatably coupled to the inside of the forward and rear outer bodies via mechanical gears, and including directional control fins mounted on a housing at the rear end of the inner body.

16 Claims, 5 Drawing Sheets

(56) References Cited

U.S. PATENT DOCUMENTS

| | | | | |
|---|---|---|---|---|
| 4,700,788 | A * | 10/1987 | Langner | E21B 7/04 |
| | | | | 405/270 |
| 5,203,274 | A * | 4/1993 | Hart | B60F 3/0023 |
| | | | | 440/5 |
| 6,966,807 | B2 * | 11/2005 | Leonov | B63H 21/17 |
| | | | | 440/98 |
| 7,055,625 | B1 * | 6/2006 | Myrick | E21B 49/06 |
| | | | | 175/58 |
| 7,225,881 | B1 * | 6/2007 | Bushnell | E21B 47/01 |
| | | | | 175/323 |
| 7,255,618 | B2 * | 8/2007 | Leonov | B60F 3/0023 |
| | | | | 440/98 |
| 7,493,843 | B2 * | 2/2009 | Grosch | F42B 10/62 |
| | | | | 89/1.13 |
| 8,004,405 | B1 * | 8/2011 | Gal | G08B 13/122 |
| | | | | 340/556 |
| 9,115,542 | B1 * | 8/2015 | Calvert | E21B 49/02 |
| 9,121,156 | B1 * | 9/2015 | Calvert | E21B 27/02 |
| 10,435,988 | B2 * | 10/2019 | Steib | E21B 37/02 |
| 10,914,052 | B1 * | 2/2021 | Hemmati | G02B 6/54 |
| 2003/0127256 | A1 * | 7/2003 | Di Napoli | B61B 13/04 |
| | | | | 180/7.2 |
| 2007/0108716 | A1 * | 5/2007 | Scruggs | B62D 15/00 |
| | | | | 152/209.1 |
| 2009/0301779 | A1 * | 12/2009 | Bick | E21B 7/26 |
| | | | | 175/323 |
| 2010/0130077 | A1 * | 5/2010 | Foo | B60F 3/0023 |
| | | | | 440/12.65 |
| 2017/0292329 | A1 * | 10/2017 | Hayik | E21B 4/04 |
| 2021/0156108 | A1 * | 5/2021 | Marvi | E02F 3/246 |

\* cited by examiner

UNMANNED UNDERSAND VEHICLE

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 105147.

BACKGROUND OF THE INVENTION

Various unmanned, robotic, or autonomous vehicle systems exist and are employed in a wide variety of applications for industrial, scientific, or military purposes. Among the many uses possible, these systems permit remote observation and surveillance of their surroundings without the need for constant human monitoring or control. Unmanned vehicle systems that fly or hover using wings or rotors are well known in the art, and are usually called unmanned aerial vehicles (UAV's) or drones, but unmanned vehicle systems are also in use on the surface and subsurface of bodies of water. These vehicles are usually called unmanned surface vehicles (USV's) or unmanned undersea vehicles (UUV's). Unmanned vehicles (UMV's) are also well known in the art for land, ground, or space-based applications. For example, the U.S. National Aeronautics and Space Administration has successfully used wheeled rovers for remote exploration of planetary bodies for decades.

Land or ground-based UMV's use a variety of means of locomotion, including tracks, wheels, legs, and rollers for example. Other less conventional means of locomotion for UMV's are possible.

While many forms of unmanned vehicle are known, one unexplored area is the use of UMV's capable of tunneling or burrowing. A UMV with such a capability may be able to navigate in sand, mud, loose soils, condensed liquids, water, and other soft materials. Such a capability would be useful for scientific purposes as the UMV may be able to take environmental data of the surrounding material. Military applications are also possible, as the UMV could burrow to avoid detection or conduct stealthy long-term surveillance of an area.

SUMMARY

In one aspect, a system and apparatus for an unmanned vehicle capable of tunneling in soft materials, such as sand, is disclosed. The unmanned vehicle comprises a hollow, bullet-shaped forward outer body with a first drive screw thread on the exterior, a hollow cylindrical rear outer body with a second drive screw thread on the exterior, but threaded in the opposed direction of the first drive screw thread, and an inner body that is rotatably coupled to the inside of the forward and rear outer bodies, and including directional control structures mounted on a housing at the rear end of the inner body.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed system and apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
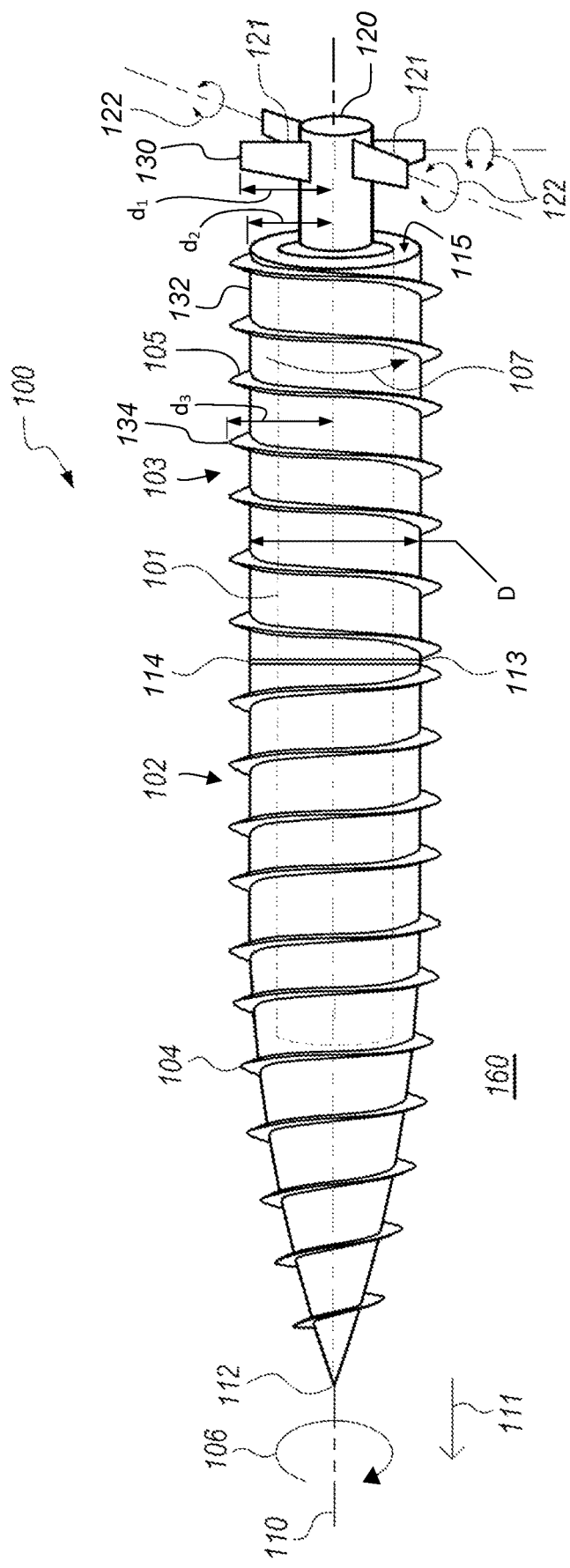
FIG. 1 is a perspective view of an unmanned vehicle capable of tunneling according to some embodiments.

One embodiment of a system and apparatus for an unmanned vehicle that is capable of tunneling in soft materials is shown in FIG. 1. The figure shows a perspective view of an unmanned vehicle 100 that comprises an inner body 101, a forward outer body 102, a rear outer body 103, and a directional control actuator housing 120. Forward outer body 102 is generally bullet-shaped and hollow and may be constructed of a hard material, for example metal, including steel, composite material, resin, or plastic. Forward outer body 102 tapers to a tip at a forward end 112 that is oriented in the direction of forward motion 111. For the purposes of this specification, forward is oriented in the direction of forward motion 111, and rearward is oriented in the opposite direction. Forward outer body 102 has at least one first drive screw thread 104 that begins at the forward end 112 of the forward outer body 102 and winds circumferentially around the exterior of forward outer body 102 to the rearward end 114 of forward outer body 102. There may be one, two, or more first drive screw threads 104 used. The first drive screw thread 104 and second drive screw thread 105 may have a thread angle of between 45 degrees and 90 degrees. The thread pitch of first drive screw thread 104 and second drive screw thread 105 is coarse, as with augers, mining drills, or other screw drives known in the art. First drive screw thread 104 may be made of the same material or a different material than that of forward outer body 102, and may be integrated into the structure and unitary with forward outer body 102, such as by casting in a mold, or first drive screw thread 104 may be welded or otherwise attached into the outer surface of forward outer body 102. First drive screw thread 104 physically engages with the surrounding material 160 of unmanned vehicle 100, such as sand or soft earth, when the forward outer body 102 rotates in a direction 106 about a centerline axis 110, imparting physical force to the surrounding material 160 and driving the unmanned vehicle 100 in the direction of forward motion 111.

FIG. 1 also shows that unmanned vehicle 100 comprises a rear outer body 103 that is cylindrical and hollow and may be constructed of a hard material, for example metal, including steel, composite material, resin, or plastic. Rear outer body 103 may be constructed of a different material than forward outer body 102. Rear outer body 103 has at least one second drive screw thread 105 that begins at the forward end 113 of the rear outer body 103 and winds circumferentially around the exterior the rear outer body 103 to the rearward end 115 of rear outer body 103. Second drive screw thread 105 may wind circumferentially in the opposite direction from first drive screw thread 104. There may be one, two, or more second drive screw threads 105 used. Second drive screw thread 105 may be made of the same material or a different material than that of rear outer body 103, and may be integrated into the structure and unitary with rear outer body 103 such as by casting in a mold, or second drive screw thread 105 may be welded or otherwise attached into the outer surface of rear outer body 103.

Figure 2:
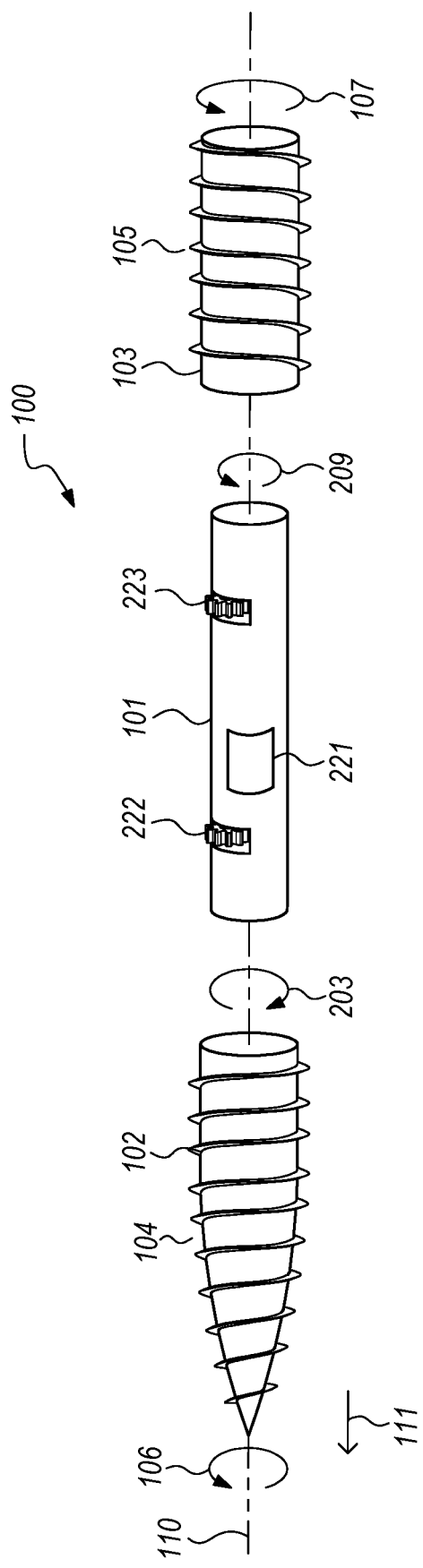
FIG. 2 is a partial exploded view of an unmanned vehicle capable of tunneling according to some embodiments.
Figure 3:
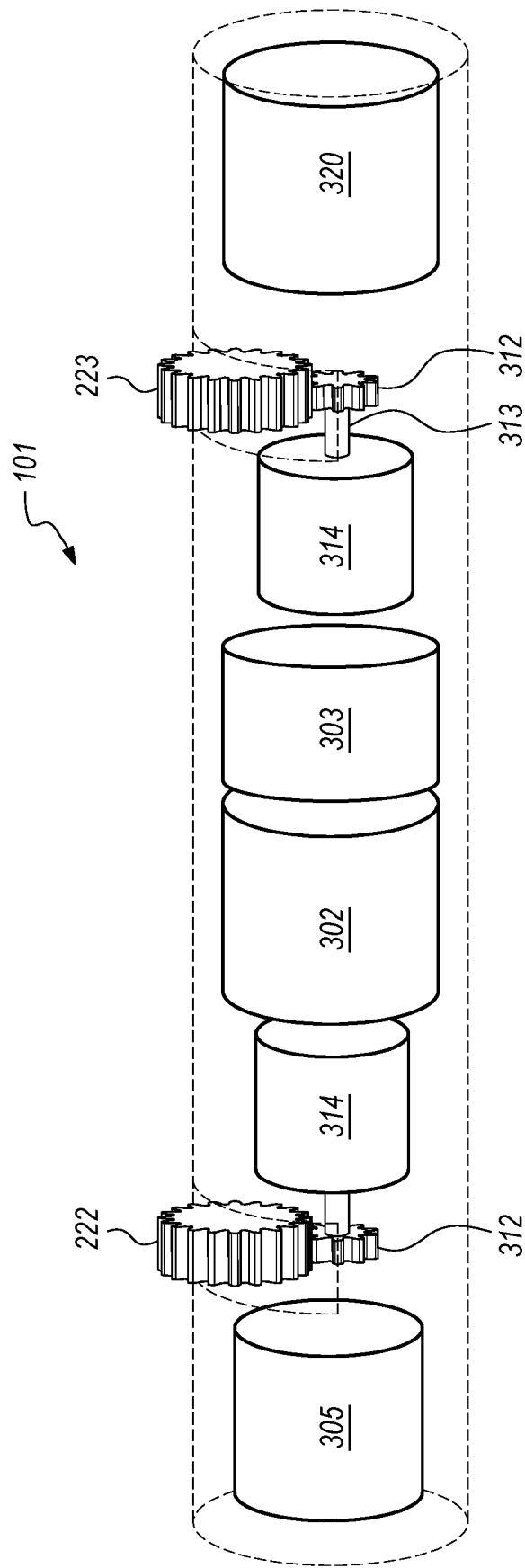
FIG. 3 is a partial perspective view of the internals of an inner body of an unmanned vehicle capable of tunneling according to some embodiments.
Figure 5:
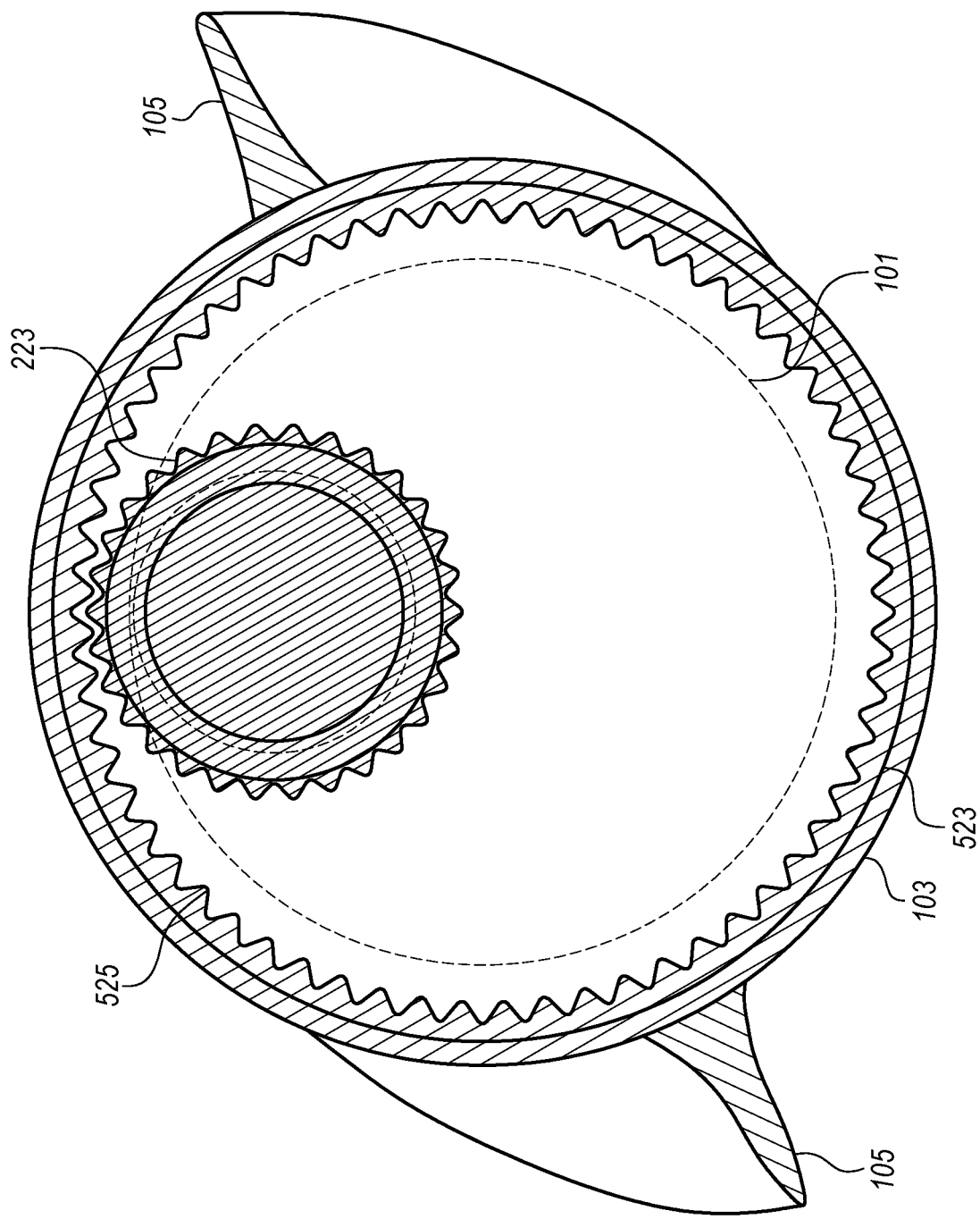
FIG. 5 is a partial cross-section view of a form of rotational engagement between an inner body and a forward or rear outer body.

FIG. 1 shows inner body 101 located inside of forward outer body 102 and rear outer body 103 with all three bodies having a common centerline axis 110. Further details of inner body 101 are shown in FIGS. 2 and 3. Inner body 101 may be cylindrical in shape, but other cross-sectional shapes are possible, such as square or octagonal. Inner body 101 may have a solid exterior with a hollow interior, or inner body 101 may have an exterior comprising of various panels, or inner body 101 may comprise a truss or grid of supports with equipment or housings mounted on it. Inner body 101 may house the control, guidance, and payload for unmanned vehicle 100, and inner body 101 is rotatably coupled to forward outer body 102 and rear outer body 103. This may be accomplished by one or more mechanical gears located on inner body 101 that engage with teeth mounted around the circumference of the inside wall of forward outer body 102 and rear outer body 103 as shown in FIG. 5. Rotation of the mechanical gears on inner body 101, by an electrical motor for example, would translate into rotation of forward outer body 102 and rear outer body 103. Alternative means of rotatably coupling inner body 101 and forward outer body 102 and rear outer body 103 are possible, such as by magnetic engagement with an electro-magnet mounted on inner body 101 with the inner walls of forward outer body 102 and rear outer body 103. Another alternative means of rotatably coupling inner body 101 and forward outer body 102 and rear outer body 103 may be through the use of rubber wheels that physically contact the inner walls of forward outer body 102 and rear outer body 103. Inner body 101 is rotatably coupled to forward outer body 102 and rear outer body 103 such that forward outer body 102 and rear outer body 103 do not move along centerline axis 110 relative to inner body 101. Motion of forward outer body 102 and rear outer body 103 relative to inner body 101 may be restricted only to rotation about centerline axis 110. This may be accomplished by using rails, interlocking grooves, or some other type of mechanical engagement between inner body 101 and forward outer body 102, and inner body 101 and rear outer body 103 for example. Forward outer body 102 and rear outer body 103 are not rotatably coupled or otherwise mechanically engaged with each other, besides being mutually rotatably coupled to inner body 101, but in other embodiments they may be.

While FIG. 1 shows forward outer body 102 and rear outer body 103 located directly adjacent to one another, other placements are possible. For example, it may be advantageous to have a large space or gap between forward outer body 102 and rear outer body 103, perhaps for the purpose providing easy access to inner body 101. This may be useful to facilitate maintenance, permit easy electronic communication with unmanned vehicle 100, or allow sensors housed in inner body 101 to have ready access to the external environment to take measurements. In alternative embodiments, there may be rotatable outer bodies that may be equipped with drive screws interposed between forward outer body 102 and rear outer body 103. Inner body 101 may also be segmented to permit greater maneuverability of unmanned vehicle 100. Inner body 101 may include one or more joints such that it can bend in one or two dimensions to increase maneuverability of unmanned vehicle 100. Inner body 101 alternatively may be articulable with a plurality of joints to have a snake-like movement.

FIG. 1 also shows a directional control actuator housing 120 rigidly attached to the rearward end of inner body 101. Actuator housing 120 is shown as cylindrical in shape, but other shapes, such as square or octagonal cross-sections are possible, and it may be made of the same or different materials as inner body 101, forward outer body 102, or rear outer body 103. Actuator housing 120 is attached to inner body 101, and extends past the rearward end 115 of rear outer body 103. Coupled to actuator housing 120 are four directional control structures 121. FIG. 1 shows these as control fins made of a resilient material, such as steel or composite plastic, but other types may be possible. In the embodiment of the unmanned vehicle 100 shown in FIG. 1, a distal tip 130 of each control fin (i.e., control structure 121) is located farther from the centerline axis 110 (i.e., distance $d_1$) than an exterior surface 132 (i.e., distance $d_2$) of the unmanned vehicle 100, and the distance $d_1$ is smaller than the distance $d_3$ between the centerline axis 110 and an outer edge 134 of the second drive screw thread 105. Directional control structure 121 could be a vectored thruster or type of propeller. While the present embodiment has four fins shown, with them oriented in two perpendicular planes, alternate embodiments may have different numbers of directional control structure 121, three for example, or they may be coupled to actuator housing 120 in a multitude of planes oriented around centerline axis 110. Direction control structure 121 is capable of rotating in 180 degrees around axis 122 allowing unmanned vehicle 100 to control its pitch, yaw, and roll as it moves in direction of forward travel 111 through a soft material, such as sand.

FIG. 2 shows a partially-exploded view of unmanned vehicle 100. Other structures included with unmanned vehicle 100, such as the direction control structures 121, are not shown in FIG. 2. Inner body 101 is rotatably coupled to forward outer body 102 and rear outer body 103 via forward mechanical gears 222 and rear mechanical gears 223. One or more forward mechanical gears 222 engage with corresponding teeth mounted in a complete ring on the inner wall of forward outer body 102. One or more rear mechanical gears 223 engage with corresponding teeth 525 mounted in a complete ring on the inner wall of rear outer body 103. This is shown in FIG. 5. FIG. 2 shows inner body 101, forward outer body 102, and rear outer body 103 have a common centerline axis 110. FIG. 2 shows one or more access panels 221 that permit access to the interior of inner body 101. In the embodiment of the unmanned vehicle 100 shown in FIGS. 1 and 2, the forward outer body 102 is bullet-shaped and the rear outer body 103 is a right circular cylindrical shell. In this embodiment, the forward end 113 of the rear outer body 103 is annular having an outer diameter D and the rearward end 115 of the rear outer body 103 is a circular base having the same outer diameter D. The rearward end 115 is parallel to the annular forward end 113 and perpendicular to the common centerline axis 110.

FIG. 2 shows forward outer body 102 has at least one first drive screw thread 104 rigidly attached to the exterior surface of forward outer body 102. Forward outer body 102 rotates in a direction 106 when driven by one or more forward mechanical gears 222 in order to drive unmanned vehicle 100 in the forward direction 111. This results in a forward counter-acting torque 208 being imparted on inner body 101. Rear outer body 103 has at least one second drive screw thread 105 rigidly attached to the exterior surface of rear outer body 103. Rear outer body 103 rotates in a direction 107 when driven by one or more rear mechanical gears 223 in order to drive unmanned vehicle 100 in the forward direction 111. This results in a rear counter-acting torque 209 being imparted on inner body 101. Unmanned vehicle 100 has a control and guidance system that balances the output of the motors that drive forward mechanical gears 222 and rear mechanical gears 223 such that the forward counter-acting torque 208 is equal and opposite to rear counter-acting torque 209. Balancing forward counter-acting torque 208 and rear counter-acting torque 209 allows inner body 101 to not rotate and stay in approximately the same horizontal plane at all times.

FIG. 3 shows an interior view of an embodiment of an inner body 101 that may be contained in an unmanned vehicle as shown in FIG. 1. FIG. 3 shows merely an exemplary embodiment of inner body 101, and it should be expressly understood that a wide variety of configurations and layouts of inner body 101 are possible. The order or layout of the components described below is not restrictive. As previously disclosed, the inner body 101 is loosely shown in a cylindrical shape, it should be understood that the cylindrical shape is not exclusive and other shapes may be possible.

In the present embodiment, inner body 101 comprises a controller housing 302, which may contain a computer for controlling the operation and navigation of the unmanned vehicle, as well as external communication system 310. All the components shown in FIG. 3 may be electronically or otherwise physically-linked such that electrical power and/ or control signals may be passed between them. A battery and power supply housing 303 contains one or more sources of electrical power, for example a battery, and the necessary components to regulate and deliver electrical power to other components within inner body 101 and the rest of the unmanned vehicle 100. Payload housing 305 contains the sensors needed to observe the external environment. Contents of payload housing 305 will be dependent on the mission of the unmanned vehicle 100. Directional control guidance and actuator housing 320 may contain the electronic circuitry and/or mechanical apparatus to actuate the directional control structures 121 to control the pitch, yaw, and roll of the unmanned vehicle 100. Forward drive gear 322 engages forward outer body 102, and is rotatably engaged with one or more coupling gears 312. The coupling gears 312 are linked to a corresponding drive gear motor 314 via a coupling gear drive shaft 313. Rear drive gear 323 engages a rear outer body 103, and is rotatably engaged with one or more corresponding coupling gears 312, linked to a corresponding drive gear motor 314 via a coupling gear drive shaft 313. It should be understood that multiple sets of forward drive gears 222 or rear drive gears 223, coupling gears 312, coupling gear drive shafts 313, and drive gear motors 314 may be employed, and that these components may be present in other forms, such as a gear box in place of coupling gears 312 and coupling gear drive shafts 313, or the use of multiple front drive gears 323 and multiple rear drive gears 322 may be engaged with a single corresponding coupling gear 312. A person of ordinary skill will recognize that there are multiple ways to rotatably couple the inner body 101 with corresponding forward outer body 102 and rear outer body 103 as described in this specification.

Figure 4:
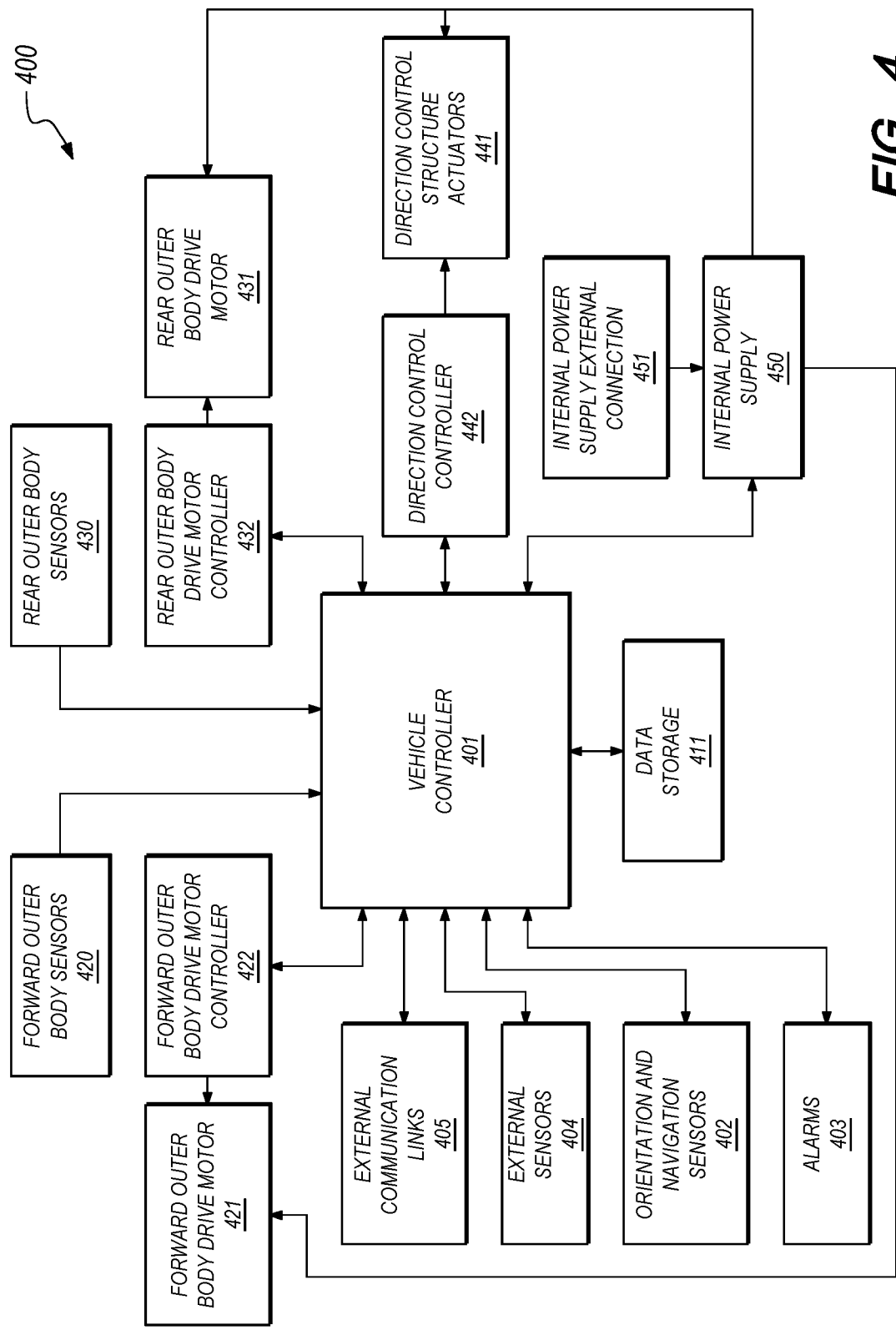
FIG. 4 is a simplified diagram of an unmanned vehicle control system for an unmanned vehicle capable of tunneling according to some embodiments.

Control of the unmanned vehicle 100 disclosed in this specification may be achieved by use of the exemplary unmanned vehicle control system 400 disclosed in FIG. 4. Many alternatives are available and it should be understood that FIG. 4 merely represents one embodiment that contains exemplary components that may be used to control the unmanned vehicle 100 described in this specification.

FIG. 4 shows that unmanned vehicle control system and method 400 comprises a vehicle controller 401, which may consist of one or more CPU's or microcontrollers, or may be an electronic device with a memory containing a non-transitory machine-readable medium comprising machine executable code having instructions stored thereon to control and operate an unmanned vehicle 100. Vehicle controller 401 is linked to a data storage 411, such as a solid state computer hard drive, that may store data or commands needed to control or operate the unmanned vehicle 100, or may store sensory information derived from external sensors mounted on the unmanned vehicle 100. Vehicle controller 401 may also be linked with and receive and transmit electronic signals to/from alarms 403. To support control and navigation of the unmanned vehicle 100, vehicle controller 401 may be electronically linked with orientation and navigation sensors 402, such as an inertial navigation system or gyroscope, and vehicle controller 401 may be electronically linked to an external communication links 405, such as a Global Positioning System antenna, VHF antenna, Near-Field Communication (NFC), or the like. External sensors 404 may provide scientific, environmental, or other surveillance information, and may be linked to vehicle controller 401. External sensors 404 may include thermometers, magnetometers, electro-optical cameras, infrared cameras, or any such similar sensor needed to detect a characteristic of the unmanned vehicle's 100 surroundings.

Vehicle controller 401 may also be electronically linked to a forward outer body drive motor controller 422, which controls the rotation of the forward outer body 102 as described previously. Forward outer body drive motor controller 422 may send feedback to vehicle controller 401 and may be electronically linked to a forward outer body drive motor 421, and may direct the speed and rotation direction of forward outer body drive motor 421 as required by vehicle controller 401. Vehicle controller 401 may receive independent feedback on the rotation of a forward outer body 102 through forward outer body sensors 420. Vehicle controller 401 may also be electronically linked to a rear outer body drive motor controller 432 which may also be linked to a rear outer body drive motor 431, and may direct the speed and rotation direction of rear outer body drive motor 421 as required by vehicle controller 401. Vehicle controller 401 may receive independent feedback on the rotation of a rear outer body 103 through rear outer body sensors 430. Vehicle control 401 may also be electronically linked to a direction control controller 442, which in turn may control the position or direction of a direction control structure actuators 441. For example, direction control structure actuators 441 may manipulate or adjust the position of a control fin to control the pitch, yaw, or roll of unmanned vehicle 100. The unmanned vehicle control system and method 400 may receive electrical power from an internal power supply 450. Internal power supply 450 may provide power to the vehicle controller 401, forward outer body drive motor 421, rear outer body drive motor 431, and direction control structure actuators 441 as needed. Internal power supply 450 may consist of one or more batteries of various types, and may have an internal power supply external connection 451 to allow for recharge of the internal power supply 450 via hookup to an external source.

FIG. 5 shows a partial cross section view of an embodiment for rotatably coupling inner body 101 with rear outer body 103. It should be understood that the embodiment of FIG. 5 may show how inner body 101 may be rotatably coupled to forward outer body 102. An outline of inner body 101 is only shown in FIG. 5 for clarity and the entire structure and internal equipment or components of inner body 101 are not shown. A mechanical gear 223 engages with corresponding teeth 525 mounted in a complete ring on an inner wall 523 of rear outer body 103. By rotating mechanical gear 223, rotational force is translated to teeth 525. Teeth 525 may be rigidly attached to the inner wall 523 of rear outer body 103, via welding for example, or they may be integrated into the rear outer body 103, for example if rear outer body 103 is cast in a mold or machined out of metal. Rotating teeth 525 rotates rear outer body 103 allowing second drive screw thread 105 to physically engage with the surrounding material 160 of unmanned vehicle 100. While two second drive screw threads 105 are shown, it is understood that the number of second drive screw threads may be varied, for example only one, or a plurality of second drive screw threads. Further, while FIG. 5 shows only one mechanical gear 223, it should be understood that multiple mechanical gears 223 may rotatably engage with teeth 525. For example, an alternative could use two mechanical gears 223 located at opposing diameters of inner body 101. The embodiment shown in FIG. 5 does not limit alternatives to rotatably coupling inner body 101 with rear outer body 103, or forward outer body 102. Possible alternatives could include a magnetic drive mounted on inner body 101 that interfaces with a rail mounted to the inner wall 523 of rear outer body 103, or use of rubber wheels mounted on inner body 101 that use friction when in contact with the inner wall 523 of rear outer body 103.

From the above description of a system and apparatus of an unmanned vehicle capable of tunneling in soft materials, it is manifest that various techniques may be used for implementing the concepts of unmanned vehicle 100, inner body 101, and unmanned vehicle control system and method 400 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that unmanned vehicle 100, and unmanned vehicle control system and method 400 is not limited to the particular embodiments described herein, but is capable of many embodiments without departing from the scope of the claims.

I claim:

1. An unmanned vehicle comprising:
a forward outer body, generally cylindrical and hollow, with a forward end tapering to a point;
a first drive screw thread rigidly attached to the forward outer body beginning at the forward end of the forward outer body and winding circumferentially around the exterior to the rearward end of the forward body;
a rear outer body comprising a hollow cylinder with a rearward end that is not tapered, but is circular and perpendicular to a centerline axis of the unmanned vehicle;
a second drive screw thread rigidly attached to the rear outer body, the second drive screw thread beginning at a forward end of the rear outer body and winding circumferentially around the rear outer body but winding in the direction opposite to that of the first drive screw thread rigidly attached to the forward outer body;
an inner body rotatably coupled to the forward and rear outer bodies, capable of rotating the forward and rear outer bodies about a centerline axis;
a directional control actuator housing rigidly attached to a rear end of the inner body and extending past the rearward end of the rear outer body with a plurality of directional control structures coupled to the directional control actuator housing; and
wherein the directional control structures are a plurality of fins, and wherein a distal tip of each fin is located farther from the centerline axis than an exterior surface of the unmanned vehicle and closer than an outermost edge of the second drive screw thread.

2. The unmanned vehicle of claim 1 wherein:
the plurality of directional control structures is configured to control pitch, yaw, and roll of the unmanned vehicle.

3. The unmanned vehicle of claim 1 wherein:
the inner body is mechanically engaged to the forward and rear bodies via a plurality of rubber wheels engaging the inner walls of the forward and rear bodies, wherein the rubber wheels are driven by electrical motors.

4. The unmanned vehicle of claim 1 further comprising:
a control and guidance system housed within the inner body.

5. The unmanned vehicle of claim 1 further comprising:
an electric power source housed within the inner body.

6. The unmanned vehicle of claim 1 further comprising:
an external environment sensor housed within the inner body.

7. The unmanned vehicle of claim 1 wherein:
the inner body is magnetically engaged to the forward and rear bodies via an electro-magnet mounted on the inner body.

8. The unmanned vehicle of claim 1 wherein:
the inner body comprises at least two segments joined together by a joint so as to allow the unmanned vehicle to bend in at least one dimension.

9. An unmanned vehicle capable of tunneling comprising:
a hollow, bullet-shaped, forward outer body with a first drive screw thread integrated into the forward outer body beginning at a forward end of the forward outer body and winding circumferentially around an exterior to a rearward end of the forward outer body;
a hollow, cylindrical, rear outer body with a second drive screw thread integrated into the rear outer body, the second drive screw thread beginning at a forward end of the rear outer body and winding circumferentially around an exterior of the rear outer body but winding in a direction opposite to that of the first drive screw thread;
an inner body mounted within and rotatably coupled to the forward and rear outer bodies;
a directional control actuator housing rigidly attached to a rearward end of the inner body and extending past the rearward end of the rear outer body with a plurality of directional control structures coupled to the directional control actuator housing;
wherein each of the directional control structures is a vectored thruster;
wherein the unmanned vehicle is not tethered to anything; and
wherein the inner body contains a sensor payload, electrical power system, and control and guidance system.

10. The unmanned vehicle of claim 9 wherein:
the inner body, forward body, and rear body have a common centerline axis.

11. The unmanned vehicle of claim 10 wherein:
the inner body is capable of rotating the forward and rear outer bodies about the centerline axis.

12. The unmanned vehicle of claim 9 wherein:
the forward outer body has a set of mechanical teeth rigidly attached to an inside wall of the forward outer body around the entire circumference of the forward outer body;
the inner body comprises a mechanical gear that engages the mechanical teeth on the inside wall of the forward outer body, the mechanical gear coupled to an electric motor;
the rear outer body has a set of mechanical teeth rigidly attached to an inside wall of the rear outer body around the entire circumference of the rear outer body; and
the inner body comprises a mechanical gear that engages the mechanical teeth on the inside wall of the rear outer body, the mechanical gear coupled to an electric motor.

13. An apparatus comprising:
an inner body;
a forward outer body coupled to the inner body, wherein the forward outer body rotates around a common centerline axis with the inner body and the inner body is partially inside of the forward outer body;
a first drive screw thread rigidly attached to the forward outer body, the first drive screw thread winding circumferentially around the forward outer body from a point at a forward end of the forward outer body to a rearward end of the forward outer body;
a rear outer body coupled to the inner body, wherein the rear outer body rotates around the common centerline axis and the inner body is partially inside of the rear outer body;
a second drive screw thread rigidly attached to the rear outer body, the second drive screw thread winding circumferentially around the rear outer body from a forward end to a rearward end of the rear outer body;
the inner body having a means for rotation of the forward outer body and rear outer body, wherein the rotation causes the apparatus to move in a forward direction through a surrounding material; and,
a direction control housing rigidly attached to the rearward end of the inner body with direction control structures rotatably coupled to the direction control housing, wherein the direction control structures control the pitch, yaw, and roll of the apparatus, wherein the directional control structures are a plurality of fins, and wherein a distal tip of each fin is disposed farther from the centerline axis than an exterior surface of the rear outer body and closer to the centerline axis than an outer edge of the second drive screw thread.

14. The apparatus of claim 13 wherein:
the inner body is cylindrical.

15. The apparatus of claim 13 wherein:
the forward outer body is bullet-shaped; and
the rear outer body is a right circular cylindrical shell, wherein the forward end of the rear outer body is annular having an outer diameter D, wherein the rearward end of the rear outer body is a circular base having the same outer diameter D, and wherein the rearward end is parallel to the annular forward end and perpendicular to the common centerline axis.

16. The apparatus of claim 15 wherein:
the inner body is rotatably coupled to the forward outer body and the rear outer body by a plurality of rubber wheels;
the plurality of rubber wheels in physical contact with an inner wall of the forward outer body and an inner wall of the rear outer body.

* * * * *